United States Patent
No et al.

(10) Patent No.: US 7,924,041 B2
(45) Date of Patent: Apr. 12, 2011

(54) LIQUID CRYSTAL DISPLAY INCLUDING SENSING UNIT FOR COMPENSATION DRIVING

(75) Inventors: Sang-Yong No, Seoul (KR); Yong-Jo Kim, Gwangmyeong-si (KR); Sung-Hoon Kim, Seoul (KR); Young-Hoon Yoo, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 122 days.

(21) Appl. No.: 12/243,405

(22) Filed: Oct. 1, 2008

(65) Prior Publication Data
US 2009/0207333 A1    Aug. 20, 2009

(30) Foreign Application Priority Data
Feb. 14, 2008  (KR) ................. 10-2008-0013460

(51) Int. Cl.
*G01R 31/26*  (2006.01)
*G01R 31/28*  (2006.01)
(52) U.S. Cl. .......... 324/760.01; 349/41; 349/54; 345/87
(58) Field of Classification Search ............ 324/770, 324/760.01; 349/41, 54; 345/87
See application file for complete search history.

(56) References Cited

U.S. PATENT DOCUMENTS

| | | | | |
|---|---|---|---|---|
| 7,446,739 | B2 * | 11/2008 | Nakanishi et al. | 345/76 |
| 2005/0007526 | A1 * | 1/2005 | Lim | 349/110 |
| 2005/0258859 | A1 * | 11/2005 | So et al. | 324/770 |
| 2007/0146003 | A1 * | 6/2007 | Hayafuji | 324/770 |
| 2009/0027316 | A1 * | 1/2009 | Kim | 345/80 |

FOREIGN PATENT DOCUMENTS
EP            1227467      *   7/2002

* cited by examiner

*Primary Examiner* — Ha Tran T Nguyen
*Assistant Examiner* — Emily Y Chan
(74) *Attorney, Agent, or Firm* — Cantor Colburn LLP (57) ABSTRACT

A liquid crystal display includes; a plurality of pixels, each of which comprises a switching element having a control terminal and an input terminal connected to a corresponding gate line of a plurality of gate lines and a corresponding data line of a plurality of data lines, respectively, at least one test pixel comprising at least one test switching element having a control terminal connected to a corresponding at least one gate line of a plurality of gate lines, and a sensing unit which measures a leakage current flowing through the test pixel and to control compensation driving of a threshold voltage of a switching element of a pixel according to the measured leakage current.

12 Claims, 5 Drawing Sheets

LIQUID CRYSTAL DISPLAY INCLUDING SENSING UNIT FOR COMPENSATION DRIVING

This application claims priority to Korean Patent Application No. 10-2008-0013460 filed on Feb. 14, 2008 and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display, and more particularly to a liquid crystal display including a sensing unit for compensation driving.

(b) Description of the Related Art

Currently, flat panel displays, examples of which include organic light emitting diode displays ("OLED"), plasma display panels ("PDP") and liquid crystal displays ("LCD"), are being actively developed as alternatives to heavy and large cathode ray tubes.

The PDP is a device that displays an image using plasma generated by a gas discharge, and the OLED display is a device that displays an image using electroluminescence of a specific organic material or a polymer. The LCD adjusts transmittance of light passing through a liquid crystal layer by applying an electric field to the liquid crystal layer, which is interposed between two display panels, and adjusting the intensity of the electric field, thereby obtaining a desired image.

In general, an LCD includes two display panels in which pixel electrodes and a common electrode are respectively provided, and a liquid crystal layer, which has a dielectric anisotropy, is interposed therebetween. The pixel electrodes are arranged in a matrix form and are connected to switching elements such as thin film transistors ("TFT") to sequentially receive a data voltage row by row. The common electrode is formed over an entire surface of the display panel to receive a common voltage. A pixel electrode, the common electrode, and the liquid crystal layer therebetween constitute a liquid crystal capacitor, and the liquid crystal capacitor and a switching element that is connected thereto become a basic unit for constituting a pixel.

If an operating time period of the LCD is lengthened, a color bleach failure may be generated. The color bleach failure is a phenomenon in which a color that is represented by an input image signal is distorted to other colors. Users may interpret the phenomenon as a failure. For example, when a pixel that should be represented in a black color is represented by a gray color, a user may interpret such a representation as a failure of the LCD. When a switching element that transfers a data signal to a liquid crystal pixel is turned off a leakage current flows, whereby an undesired data signal is applied to the liquid crystal pixel and the phenomenon thus occurs. Specifically, switching elements of a plurality of liquid crystal pixels are connected to each of a plurality of gate electrodes extending from gate lines that are parallelly formed in a row direction. According to a selection signal that is sequentially applied to each of a plurality of gate electrodes on a gate line, if a switching element is turned on, a data signal is transferred to a liquid crystal layer through a data line. In this case, if a leakage current flows to a switching element that is turned off, a data signal to be applied to another liquid crystal pixel is applied to a liquid crystal pixel that is connected to the turned off switching element by the leakage current. Thereby, a color of the liquid crystal pixel that is connected to the switching element that is turned off is distorted.

BRIEF SUMMARY OF THE INVENTION

The present invention provides a liquid crystal display ("LCD") having advantages of preventing a color bleach phenomenon.

An exemplary embodiment of the present invention provides an LCD including; a plurality of gate lines which transfer a plurality of gate signals, a plurality of data liens which transfers a plurality of data signals, at least one dummy data lien which transfers at least one test data signal, a data driver which generates and outputs the plurality of data signals, a gate driver which generates and outputs the plurality of gate signals, a plurality of pixels, each of which comprises a switching element having a control terminal and an input terminal connected to a corresponding gate line of the plurality of gate lines and a corresponding data line of the plurality of data lines, respectively, at least one test pixel comprising at least one test switching element having a control terminal connected to a corresponding at least one gate line of the plurality of gate lines, and a sensing unit which measures a leakage current flowing through the test switching element and controls compensation driving of a threshold voltage of the switching element according to the measured leakage current.

Another exemplary embodiment of the present invention provides an LCD including; a first switching element which includes a control terminal and an input terminal, a first scanning line which transfers a selection signal to the control terminal of the first switching element to control a switching operation of the switching element, a first data line electrically connected to the input terminal of the first switching element, and a second switching element that comprises a control terminal and an input terminal, wherein the selection signal is input to the control terminal of the second switching element to control a switching operation of the second switching element, and the input terminal of the second switching element is connected to a second data line, wherein a connection between the input terminal of the first switching element and the first data line is intercepted and a leakage current flowing through the first switching element is measured when the LCD is not driven, and if the leakage current is equal to or greater than a predetermined threshold value, a predetermined voltage is applied to each of the first scanning line and the second data line. Another exemplary embodiment of the present invention provides a method of driving a liquid crystal display. The method includes: providing a plurality of gate signals to a plurality of gate lines, wherein the plurality of gate signals includes a gate-off signal; providing a plurality of data signals to a plurality of data lines; controlling a switching operation of a first switching element and a second switching element using at least one of the plurality of gate signals; measuring a leakage current flowing through the first switching element during the application of a gate-off signal to a control terminal of the first switching element and the application of a data signal to an input terminal of the first switching element; and controlling compensation driving of the first and second switching elements according to the measured leakage current.

The present invention provides an LCD which prevents a color bleach phenomenon and that provides a clearer picture quality by detecting a leakage current when the LCD is not driven and compensating a threshold voltage change of a switching element.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 1:
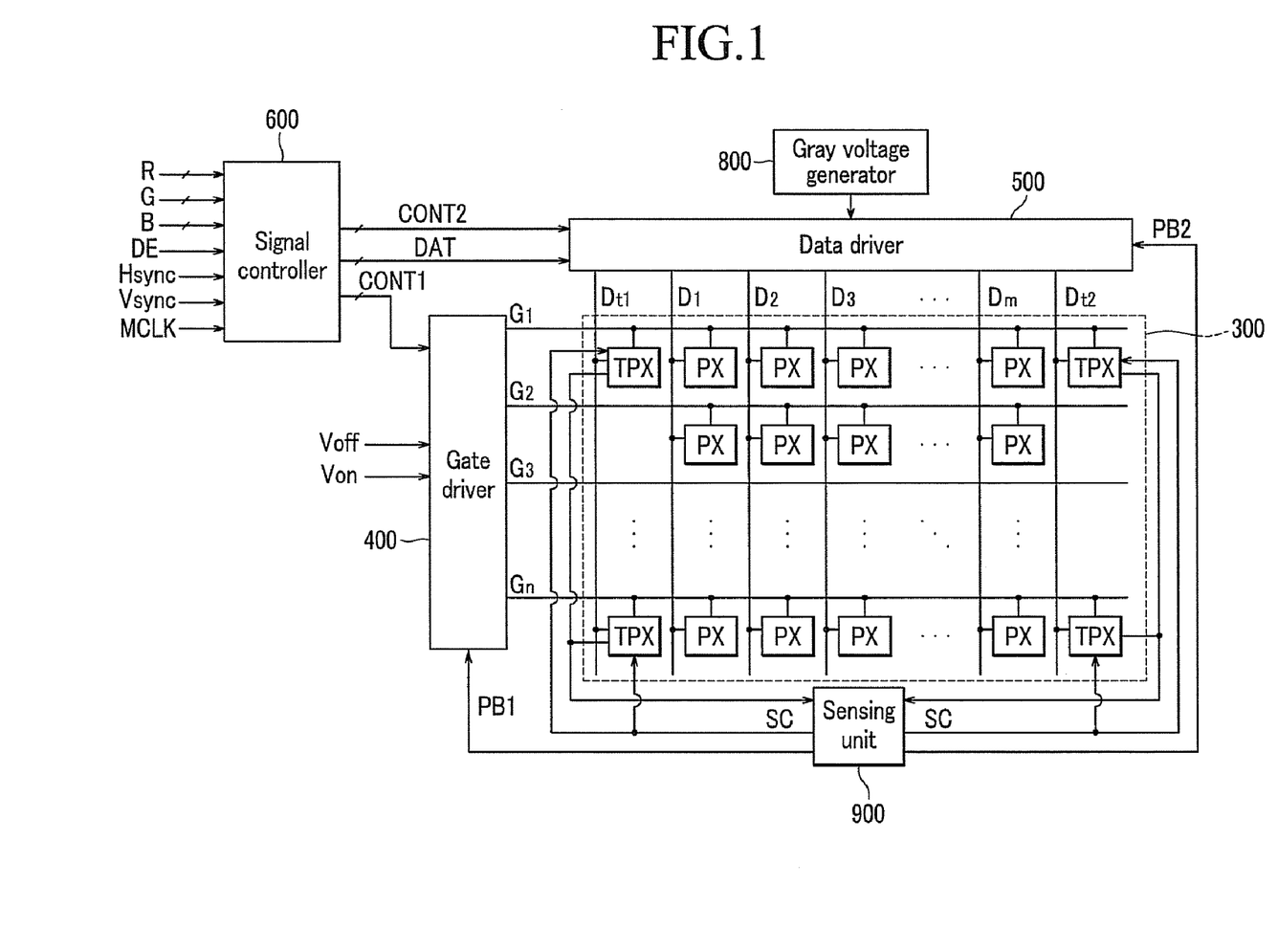
FIG. 1 is a block diagram of an exemplary embodiment of a liquid crystal display ("LCD") according to the present invention.
Figure 2:
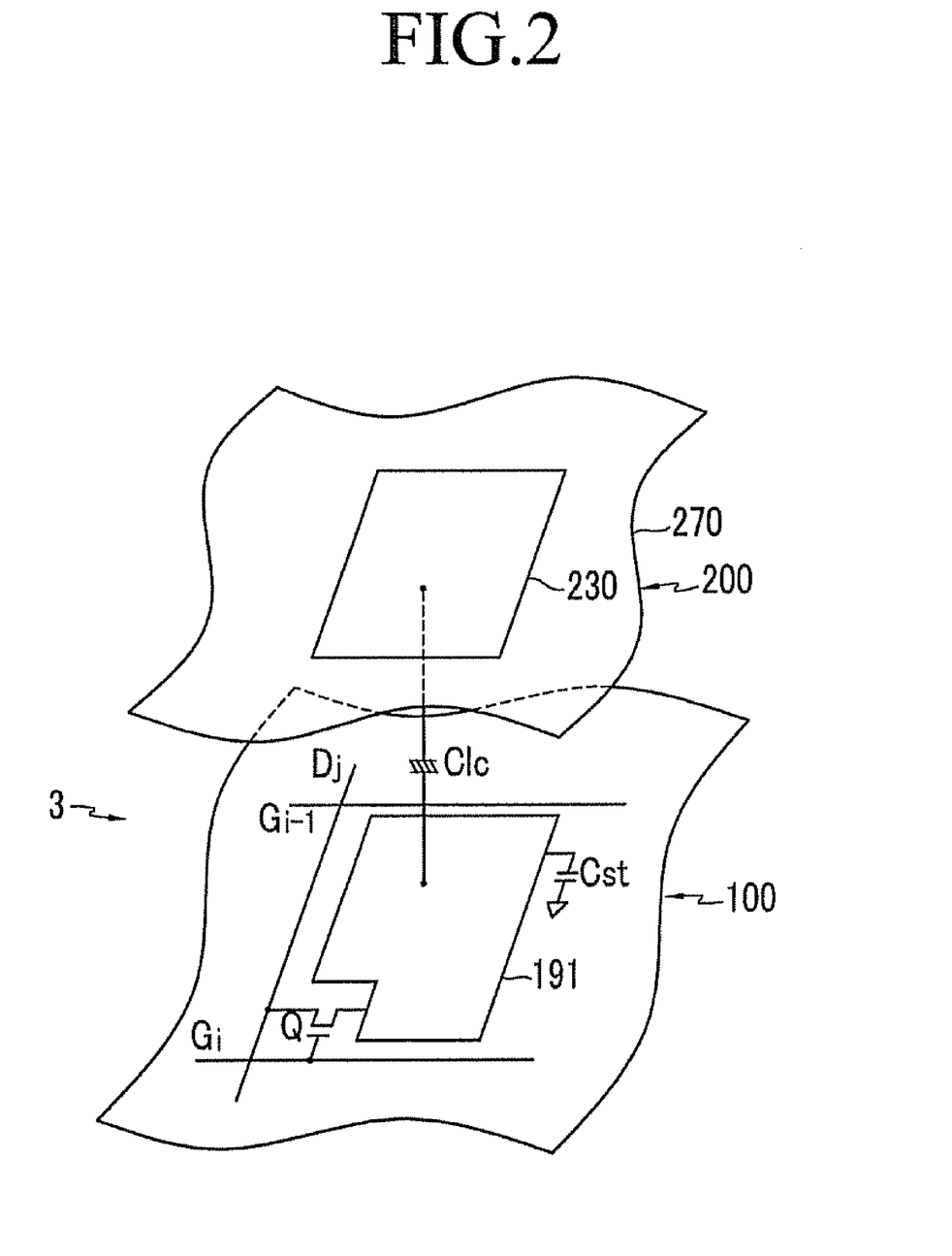
FIG. 2 is an equivalent circuit diagram of a pixel of an exemplary embodiment of an LCD according to the present invention.

An exemplary embodiment of a liquid crystal display ("LCD") according to the present invention will be described in detail with reference to FIGS. 1 and 2. FIG. 1 is a block diagram of an exemplary embodiment of an LCD according to the present invention, and FIG. 2 is an equivalent circuit diagram of a pixel of an exemplary embodiment of an LCD according to the present invention.

Referring to FIG. 1, an exemplary embodiment of an LCD according to the present invention includes a liquid crystal panel assembly 300, a gate driver 400, a data driver 500, a gray voltage generator 800, a signal controller 600 and a sensing unit 900.

Referring to FIG. 1, the liquid crystal panel assembly 300 includes a plurality of signal lines G1-Gn, D1-Dm, Dt1, and Dt2, a plurality of pixels PX which are connected thereto and that are arranged in an approximate matrix form and a plurality of test pixels TPX which measure a leakage current. From a structural view that is shown in FIG. 2, the liquid crystal panel assembly 300 includes lower and upper panels 100 and 200 which are disposed substantially opposite to each other, and a liquid crystal layer 3 that is interposed therebetween.

The signal lines G1-Gn and D1-Dm include a plurality of gate lines G1-Gn that transfer a gate signal (referred to as a "scanning signal"), a plurality of data lines D1-Dm that transfer a data voltage and dummy data lines Dt1 and Dt2. The gate lines G1-Gn extend approximately in a row direction and are substantially parallel to each other, and the data lines D1-Dm and the dummy data lines Dt1 and Dt2 extend approximately in a column direction and are substantially parallel to each other. The dummy data lines Dt1 and Dt2 transfer a test data signal to a test pixel TPX. Each of test data signals that are transferred through the dummy data lines Dt1 and Dt2 may be identical to any data signal that is transferred through a plurality of data lines D1-Dm, and the data driver 500 may separately generate a test data signal to transfer to each of the dummy data lines Dt1 and Dt2.

As shown in FIG. 2, each pixel PX, for example a pixel PX that is connected to an i-th (wherein i=1, 2, . . . , n) gate line Gi and a j-th (wherein j=1, 2, . . . , m) data line Dj, includes a switching element Q connected to the signal lines Gi and Dj, and a liquid crystal capacitor Clc and a storage capacitor Cst that are connected thereto. Exemplary embodiments include configurations wherein the storage capacitor Cst may be omitted, as needed.

In the current exemplary embodiment, the switching element Q is a three terminal element such as a thin film transistor ("TFT") that is provided in the lower panel 100, a control terminal thereof is connected to the gate line Gi, an input terminal thereof is connected to the data line Dj and an output terminal thereof is connected to the liquid crystal capacitor Clc and the storage capacitor Cst.

The liquid crystal capacitor Clc includes a pixel electrode 191 of the lower panel 100 and a common electrode 270 of the upper panel 200 as two terminals thereof, and the liquid crystal layer 3 between two electrodes 191 and 270 functions as a dielectric material. The pixel electrode 191 is connected to the switching element Q, and the common electrode 270 is formed on substantially an entire surface of the upper panel 200 and receives a common voltage Vcom. Although not shown in FIG. 2, alternative exemplary embodiments include configurations wherein the common electrode 270 may be provided in the lower panel 100, and in such exemplary embodiments, at least one of the two electrodes 191 and 270 may be formed in a line shape or a bar shape.

The storage capacitor Cst may act as an assistant to the liquid crystal capacitor Clc, and may be formed by an overlap of a separate signal line (not shown) and the pixel electrode 191 that are provided in the lower panel 100 with an insulator interposed therebetween, and a predetermined voltage such as a common voltage Vcom may then be applied to the separate signal line. However, in alternative exemplary embodiments the storage capacitor Cst may be formed by an overlap of the pixel electrode 191 and a previous gate line (Gi-1) directly on the electrode 191 via the insulator.

In order to represent a color display, each pixel PX may intrinsically display one of the primary colors (spatial division), or each pixel PX may sequentially alternately display the primary colors (temporal division), a desired color is recognized by the spatial and temporal combination of the primary colors. An example of a set of the primary colors includes red ("R"), green ("G") and blue ("B") colors. FIG. 2 shows as an example of spatial division that each pixel PX is provided with a color filter 230 for representing one of the primary colors in a region of the upper panel 200 corresponding to the pixel electrode 191. Although not shown in FIG. 2, alternative exemplary embodiments include configurations wherein the color filter 230 may be provided on or under the pixel electrode 191 of the lower panel 100.

At least one polarizer (not shown) is provided above or below the liquid crystal panel assembly 300.

Referring again to FIG. 1, in one exemplary embodiment the gray voltage generator 800 generates all gray voltages and in another exemplary embodiment the gray voltage generator 800 generates a limited number of gray voltages (hereinafter referred to as "reference gray voltages") that are related to transmittance of the pixel PX. Each (reference) gray voltage can have a positive value and a negative value relative to a common voltage Vcom.

The gate driver 400 is connected to the gate lines G1-Gn of the liquid crystal panel assembly 300 to apply a gate signal consisting of a combination of a gate-on voltage Von and a gate-off voltage Voff to the gate lines G1-Gn.

The data driver 500 is connected to the data lines (D1-Dm) of the liquid crystal panel assembly 300, and in one exemplary embodiment selects a gray voltage from the gray voltage generator 800, and applies the gray voltage as a data voltage to the data lines D1-Dm. In the alternative exemplary embodiment wherein the gray voltage generator 800 provides only the limited number of reference gray voltages, rather than providing all gray voltages, the data driver 500 generates a desired data voltage by dividing a reference gray voltage.

The data driver 500 also transfers a test data signal to each of the dummy data lines Dt1 and Dt2. In one exemplary embodiment, the test data signal may be a signal having the same voltage as any data voltage that is transferred through the plurality of data lines D1-Dm. In such an exemplary embodiment, the data driver 500 transfers a data voltage that is transferred to the data line D1 to the dummy data line Dt1 and transfers a data voltage that is transferred to the data line Dm to the dummy data line Dt2. Alternatively, a data voltage of a data line that is different from the data line D1 and the data line Dm may be transferred to each of the dummy data lines Dt1 and Dt2. Furthermore, alternative exemplary embodiments include configurations wherein a separate data voltage, rather than a data voltage of the plurality of data lines D1-Dm, may be generated and be transferred to each of the dummy data lines Dt1 and Dt2.

The sensing unit 900 measures a leakage current amount using a test pixel TPX while the LCD is in a non-operative state, and if a leakage current amount of the test pixel TPX is greater than a predetermined threshold value, restores a threshold voltage of a transistor constituting a switching element Q of a plurality of pixels PX. In order to restore a threshold voltage of a transistor, a difference between a voltage that is applied to a control terminal of the switching element and a voltage of an input terminal of the switching element should have a substantially opposite polarity to that of a voltage that is applied when the switching element is turned off while driving. In the present exemplary embodiment the input terminal of the switching element is connected to one of the plurality of data lines.

In general, a period in which a gate-on voltage is applied to a plurality of gate lines G1-Gn is much shorter than that in which a gate-off voltage is applied to the plurality of gate lines G1-Gn. While displaying an image in one frame, a period for which a gate-on voltage is applied to one among the plurality of gate lines G1-Gn corresponds to a period that a period in which a frame is displayed is divided by a plurality of gate lines. In one exemplary embodiment, if the display panel 300 includes 768 gate lines, the gate-on voltage is only applied during $1/768^{th}$ of a frame. A data voltage is applied to the input terminal of the switching transistor during the period during which the gate-on voltage is applied. A gate-off voltage is applied to the control terminal of the switching transistor for other periods except for the period in which the input terminal receives the data voltages, e.g., in the exemplary embodiment described above, the gate-off voltage is applied during 767/768$^{th}$ of a frame. Therefore, for most periods, a gate-off voltage is applied to a control terminal of the switching element.

If a time period of using an LCD is lengthened, a period in which a gate-off voltage is applied to a control terminal of the switching element is similarly lengthened, and a voltage difference between a control terminal and an input terminal of the switching element is a negative (−) voltage for most of the time period. Accordingly, a negative voltage stress is continuously applied to the switching element. In general, a transistor is used as a switching element, and if a negative voltage stress is continuously applied to the transistor, a phenomenon in which a threshold voltage of the transistor is lowered occurs. If the threshold voltage of the transistor is lowered, a leakage current increases. Therefore, the leakage current of the switching element increases due to the negative voltage stress.

Figure 3:
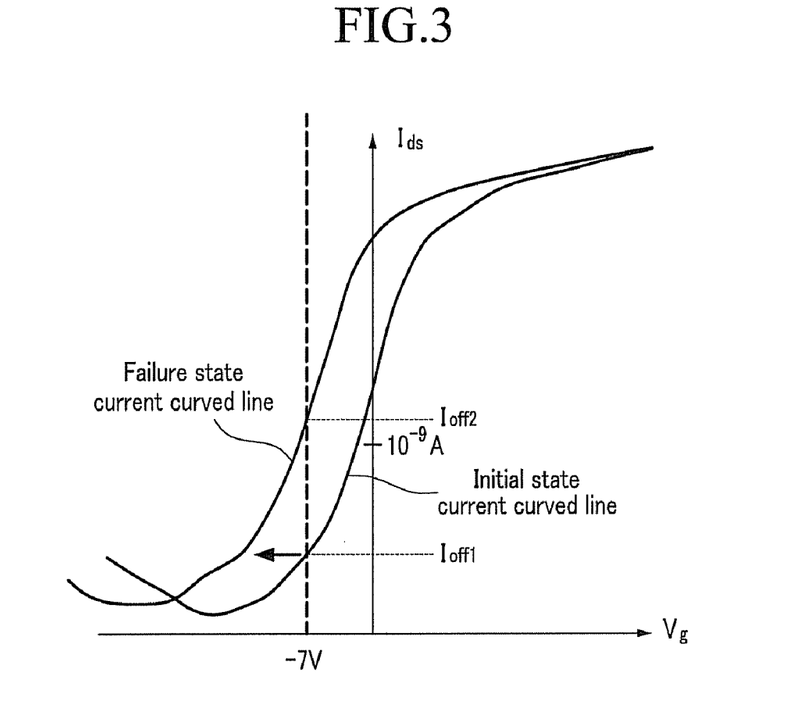
FIG. 3 is a graph illustrating an increase of a leakage current due to a decrease of a threshold voltage of a switching element.

FIG. 3 is a graph illustrating the increase of a leakage current due to a decrease of a threshold voltage. FIG. 3 illustrates a case of using an N channel type of transistor as a switching element Q. A gate electrode of a transistor corresponds to a control terminal of the switching element Q, and a source electrode and a drain electrode thereof correspond to an input terminal and an output terminal thereof, respectively.

The horizontal axis of FIG. 3 is a voltage applied to the gate electrode, and the vertical axis thereof represents a drain-source current Ids flowing between the drain electrode and the source electrode. A failure state current curved line is moved in a negative direction as compared with an initial state current curved line. The value of a horizontal axis that is indicated by dotted lines is −7V. In an exemplary embodiment of the present invention, "−7V" is an example of a gate-off voltage. At a voltage of "−7V", a drain-source current Ioff2 of a failure state is greater than a drain-source current Ioff1 of an initial state. While neither the drain-source current Ioff1 of an initial state or the drain-source current Ioff2 of a failure state are zero, the small amount of current passing therethrough does not affect display quality unless it exceeds a threshold value. In the exemplary embodiment shown in FIG. 3 the threshold value of the drain-source current has been set as $10^{-9}$ A for illustrative purposes. If a leakage current Ioff2 of the switching element Q surpasses $10^{-9}$ A, a color bleach phenomenon occurs, and in this case, the current value "$10^{-9}$ A" is set as a threshold value. However, the present invention is not limited to the above exemplary embodiment of a threshold drain-source current value, and according to characteristics of an LCD, other values may be set as the threshold value.

When an LCD of the present invention is not driven, the sensing unit 900 measures a leakage current by applying a gate-off voltage to the test pixel TPX, and if a value of the leakage current is equal to or greater than a threshold value, the sensing unit 900 instructs the data driver 500 to restore the reduced threshold voltages of the switching elements Q of each of a plurality of pixels PX to an original state. A method of measuring a leakage current and compensation driving of a threshold voltage for reducing a leakage current are described later, together with description of the sensing unit 900 and the test pixel TPX. Hereinafter, compensation driving of a threshold voltage is referred to as "compensation driving of a threshold value."

The signal controller 600 controls the gate driver 400 and the data driver 500. In one exemplary embodiment, each of the driving devices 400, 500, 600, and 800 and the sensing unit 900 may be directly mounted on the liquid crystal panel assembly 300 in at least one IC chip form, in another exemplary embodiment they may be mounted on a flexible printed circuit film (not shown) to be attached to the liquid crystal panel assembly 300 in a tape carrier package ("TCP") form, in another exemplary embodiment they may be mounted on a separate printed circuit board ("PCB") (not shown) or in another alternative exemplary embodiment, they may be mounted using a combination of any of the above configurations. Alternatively, the driving devices 400, 500, 600, and 800 and the sensing unit 900 together with the signal lines G1-Gn and D1-Dm and the thin film transistor switching element Q may be integrated with the liquid crystal panel assembly 300. Further, alternative exemplary embodiments include configurations wherein the driving devices 400, 500, 600, and 800 and the sensing unit 900 can be integrated in a single chip, and in this case, at least one of them or at least one circuit element constituting them may be disposed outside of the single chip.

Now, an operation of the LCD will be described in detail.

The signal controller 600 receives input image signals R, G, and B and an input control signal for controlling the display of the input image signals R, G, and B from an external graphics controller (not shown). The input image signals R, G, and B contain luminance information of each pixel PX in the form of gray levels of a given number, for example, $1024(=2^{10})$, $256(=2^{8})$, or $64(=2^{6})$. The input control signal includes, for example, a vertical synchronization signal Vsync, a horizontal synchronizing signal Hsync, a main clock signal MCLK, and a data enable signal DE.

The signal controller 600 processes the input image signals R, G, and B to correspond to an operating condition of the liquid crystal panel assembly 300 based on the input image signals R, G, and B and the input control signals, and generates a gate control signal CONT1 and a data control signal CONT2, then sends the gate control signal CONT1 to the gate driver 400 and sends the data control signal CONT2 and the processed image signal DAT to the data driver 500.

The gate control signal CONT1 includes a scanning start signal STV for instructing the scanning start and at least one clock signal for controlling an output period of a gate-on voltage Von. In one exemplary embodiment, the gate control signal CONT1 may further include an output enable signal OE for limiting a sustain time period of a gate-on voltage Von.

The data control signal CONT2 includes a horizontal synchronization start signal STH for notifying of the transmission start of a digital image signal DAT for one row (set) of pixels PX, and a load signal LOAD and a data clock signal HCLK for applying an analog data voltage to the data lines (D1-Dm). The data control signal CONT2 may further include an inversion signal RVS for inverting polarity of a data voltage to a common voltage Vcom (hereinafter, "polarity of a data voltage to a common voltage" is referred to as "polarity of a data voltage").

The data driver 500 receives a digital image signal DAT for one row (set) of pixels PX according to the data control signal CONT2 from the signal controller 600, selects a gray voltage corresponding to each digital image signal DAT, thereby converting the digital image signal DAT to an analog data voltage, and then applies the analog data voltage to the corresponding data lines D1-Dm.

The gate driver 400 sequentially applies a gate-on voltage Von to gate lines G1-Gn according to the gate control signal CONT1 from the signal controller 600 to turn on the switching element Q that is connected to the gate lines G1-Gn. Accordingly, a data voltage that is applied to the data lines D1-Dm is applied to the corresponding pixel PX through the turned-on switching element Q.

The difference between the common voltage Vcom and the data voltage that is applied to the pixel PX is represented by a charge voltage, i.e., a pixel voltage of the liquid crystal capacitor Clc. Liquid crystal molecules change their arrangement according to a magnitude of a pixel voltage, so that polarization of light passing through the liquid crystal layer 3 changes. The change in the polarization corresponds to a change in transmittance of light through the polarizer, whereby a pixel PX displays luminance representing a gray level of an image signal DAT.

By repeating the process in units of one horizontal period (referred to as "1H", which in one exemplary embodiment is the same as one period of a horizontal synchronizing signal Hsync and a data enable signal DE), a gate-on voltage Von is sequentially applied to all gate lines G1-Gn and a data voltage is applied to all pixels PX, so that an image of one frame is displayed.

In one exemplary embodiment, a state of an inversion signal RVS that is applied to the data driver 500 is controlled so that a next frame starts when one frame ends and the polarity of a data voltage that is applied to each pixel PX is opposite to the polarity in a previous frame ("frame inversion"). According to characteristics of the inversion signal RVS even within one frame, the polarity of a data voltage flowing through one data line may be periodically changed (e.g. row inversion and dot inversion) or the polarity of data voltages that are applied to one pixel row may be different from each other (e.g. column inversion and dot inversion). Alternative exemplary embodiments also include configurations wherein no inversion is used.

An exemplary embodiment of a sensing unit 900 and a test pixel TPX according to the present invention will be described with reference to FIGS. 4 to 7, and measurement of a leakage current and compensation driving of a threshold value will be described.

Figure 4:
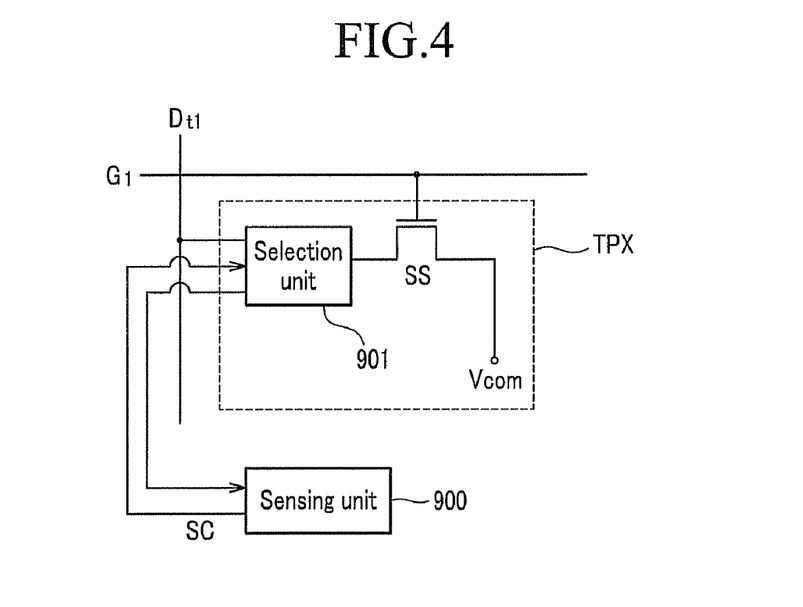
FIG. 4 is an equivalent circuit diagram illustrating an exemplary embodiment of a connection relationship between a test pixel TPX and a sensing unit 900 according to the present invention.

FIG. 4 is an equivalent circuit diagram illustrating an exemplary embodiment of a connection relationship of a test pixel TPX and a sensing unit 900 according to the present invention. FIG. 4 shows only a test pixel TPX which is connected to a dummy data line Dt1 and a gate line G1 among at least four test pixels TPX as shown in FIG. 1. Other test pixels TPX have substantially the same connection relationship as that of the gate line and a data line that are connected thereto.

An exemplary embodiment of a test switching element SS of the test pixel TPX according to the present invention has substantially the same characteristics as that of a switching element Q of the pixel PX. The test switching element SS has similar operating characteristics due to the formation of the test switching element SS and the non-test switching element Q in the liquid crystal panel assembly 300 through an identical manufacturing process. A control terminal of the test switching element SS is connected to a gate line G1, an input terminal thereof is connected to a selection unit 901 and an output terminal thereof is connected to a common electrode and thus a common voltage Vcom is applied to the output terminal. The selection unit 901 connects the input terminal to one of the dummy data lines Dt1 and the sensing unit 900 according to a control signal sent from the sensing unit 900. The selection unit 901 connects the dummy data line Dt1 and the input terminal when an LCD is driven, and connects the sensing unit 900 to the input terminal when an LCD is not driven. That is, the sensing unit 900 is not connected to the test pixel TPX for a driving period of the LCD. The sensing unit 900 is connected to the test pixel TPX to measure a leakage current when an LCD is not driven, and if the leakage current is greater than a threshold value, the sensing unit 900 controls compensation driving of a threshold value.

Figure 5:
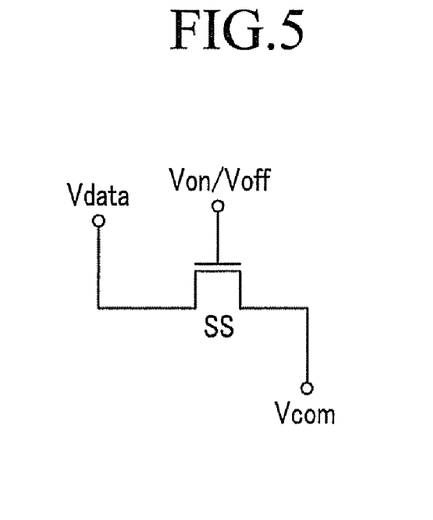
FIG. 5 is an equivalent circuit diagram illustrating a test pixel in a configuration during a driving operation of an exemplary embodiment of an LCD according to the present invention.

FIG. 5 is an equivalent circuit diagram illustrating a test pixel in a configuration during the driving operation of an exemplary embodiment of an LCD according to the present invention.

The selection unit 901 connects an input terminal of a test switching element SS to a data line Dt1 according to a connection control signal SC, and applies a data voltage Vdata that is transferred through a dummy data line Dt1 to an input terminal of the test switching element SS. A gate on/off voltage is alternately applied to a control terminal of the test switching element SS, a data voltage Vdata is applied to an input terminal of the test switching element SS, and a common voltage Vcom is applied to an output terminal of the test switching element SS. In this way, when the LCD is driven, a test pixel TPX is operated in substantially the same conditions as applied to the regular pixels PX in order to generate a similar negative voltage stress that is applied to a switching element Q of a pixel PX.

Figure 6:
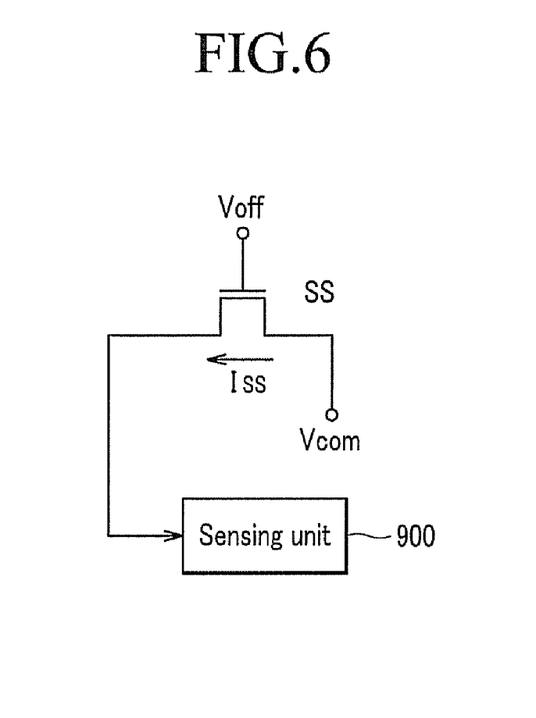
FIG. 6 is an equivalent circuit diagram illustrating a test pixel in a configuration during a non-driving operation when the sensing unit 900 measures a leakage current in an exemplary embodiment of an LCD according to the present invention.

FIG. 6 is an equivalent circuit diagram illustrating a test pixel in a configuration during a non-driving operation when the sensing unit 900 measures a leakage current in an exemplary embodiment of an LCD according to the present invention.

The selection unit 901 connects an input terminal of a test switching element SS to the sensing unit 900 according to a connection control signal SC. In this case, when a gate-off voltage is applied to a control terminal of the test switching element SS, a leakage current Iss flows therethrough. The sensing unit 900 measures the leakage current Iss flowing through the test switching element SS and compares the measured current with a threshold value.

Specifically, the sensing unit 900 generates a connection control signal SC according to a driving state of the LCD and transfers the connection control signal SC to the selection unit 901. When the LCD is not driven, the sensing unit 900 measures a leakage current Iss flowing to the test switching element SS and compares the leakage current Iss with a threshold value. In one exemplary embodiment, the sensing unit 900 charges a capacitor according to the leakage current Iss, measures a voltage that is charged to the capacitor, and compares the measured voltage with a voltage corresponding to the threshold value. Alternative exemplary embodiments include configurations wherein the sensing unit 900 includes various other voltage measuring components as would be known to one of ordinary skill in the art.

If the measured voltage is greater than the voltage corresponding to the threshold value, the sensing unit 900 controls compensation driving of a threshold value. In this case, compensation driving of a threshold value is driving for applying a positive stress having opposite polarity to that of a negative stress that is applied when the switching element Q is driven, as a gate-on voltage and a gate-off voltage are applied to a control terminal and an input terminal of a pixel, respectively. Alternative voltages may be applied to the control and input terminals in order to generate the positive stress as will be discussed in more detail below. The compensation driving of a threshold value is performed while the LCD is not driven, and after performing compensation driving of a threshold value for a predetermined period, the LCD measures a leakage current and compares the leakage current with a threshold value. If the leakage current is greater than a threshold value, the LCD again performs compensation driving of a threshold value for a predetermined period.

Specifically, if the leakage current is greater than a threshold value, the sensing unit 900 transfers compensation signals PB1 and PB2 that instruct compensation driving of a threshold value to the gate driver 400 and the data driver 500, respectively. The gate driver 400 according to an exemplary embodiment of the present invention substantially simultaneously transfers a gate-on voltage Von to a plurality of gate lines G1-Gn according to the compensation signal PB1, and the data driver 500 simultaneously transfers a gate-off voltage Voff to a plurality of data lines D1-Dm according to the compensation signal PB2. The sensing unit 900 repeats such an operation until a leakage current Iss becomes smaller than a threshold value. Accordingly, a threshold voltage of the switching element Q of a plurality of pixels PX that is lowered due to compensation driving of a threshold value can be restored to a regular state.

The regular state is a state of a switching element when an LCD operates for the first time, and a threshold voltage when a leakage current of the switching element exists within an allowable range is determined as a threshold voltage of a regular state. That is, when a measured leakage current is smaller than a threshold value, it is determined that a threshold voltage of the switching element is restored to a regular state. A threshold value may be determined to be a leakage current value lower than one where a color bleach phenomenon may be perceived by a user. Once a regular state of the switching elements has been restored the transfer of the compensation signals PB1 and PB2 is discontinued, and the gate driver 400 and the data driver 500 operates by the control of the signal controller 600.

In an alternative exemplary embodiment, the sensing unit 900 transfers the compensation signals PB1 and PB2 to the gate driver 400 and the data driver 500 for a preset threshold value compensation period without measuring a current Iss for a compensation driving period of a threshold value, and the gate driver 400 and the data driver 500 continue to perform compensation driving of a threshold value to switching elements of each of a plurality of pixels for the preset threshold value compensation period.

In the above-described exemplary embodiment of compensation driving of a threshold value according to the present invention, a gate-on voltage is applied to a control terminal of the switching element and a gate-off voltage is applied to an input terminal that is connected to the data line, but the present invention is not limited thereto. A voltage different from a gate-on voltage and a gate-off voltage may be applied to each electrode. The voltage generates a voltage difference having opposite polarity to that of a voltage difference between a control terminal and an input terminal of the switching element when the switching element is turned off while driving.

According to channel characteristics of a transistor used as a switching element, the voltage may be changed accordingly. In an exemplary embodiment of the present invention, a switching element is an N channel type of transistor, and when the switching element is driven, as a negative voltage stress is generated in the N channel transistor, and therefore a threshold voltage is lowered. However, when a switching element is a P channel type of transistor, a gate-off voltage that is applied to the gate electrode is a positive voltage and therefore, due to the positive gate-off voltage being applied for a majority of the driving time, a positive voltage stress is generated in the switching element. Accordingly, because an absolute value of a threshold voltage of a P channel type of transistor having a negative value decreases, a leakage current may increase. In compensation driving of a threshold value that recovers the increased leakage current, a gate-on voltage may be applied to a gate electrode and a gate-off voltage may be applied to an input terminal that is connected to a data electrode. As discussed above, the present invention is not limited to the application of a gate-on voltage and a gate-off voltage, but the compensation driving voltages could be any voltages which reverse the polarity of the stress applied to the switching element with respect to the stress which is applied to the switching element throughout a majority of a frame.

Figure 7:
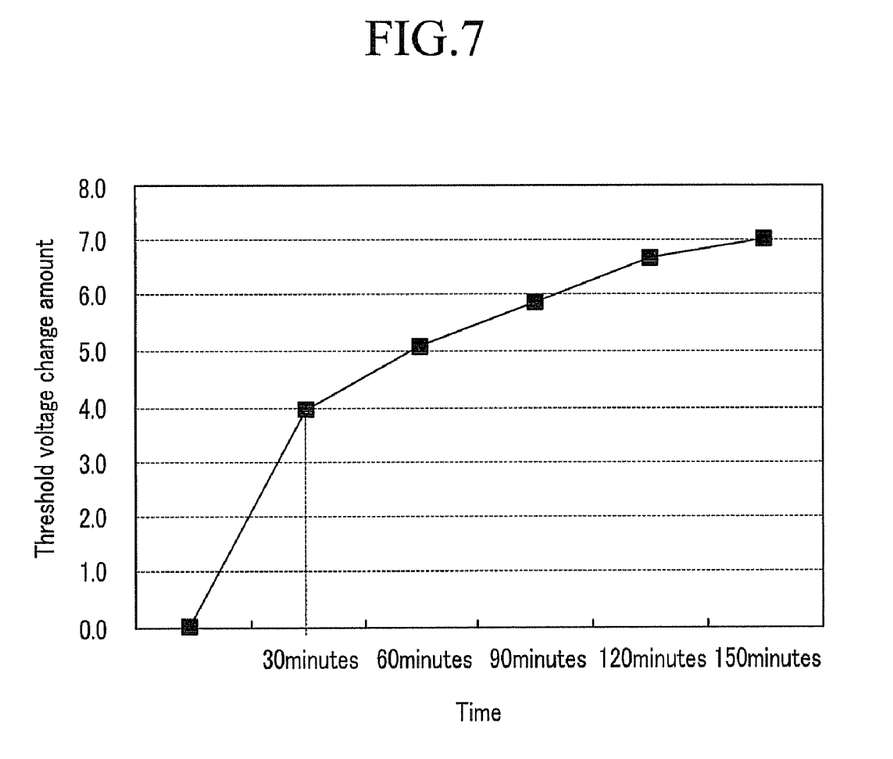
FIG. 7 is a graph illustrating an amount of threshold voltage change of a switching element according to a compensation driving result of a threshold value in an exemplary embodiment of an LCD according to the present invention.

FIG. 7 is a graph illustrating an amount of a threshold voltage change of a switching element according to a compensation driving result of a threshold value in an exemplary embodiment of an LCD according to the present invention.

FIG. 7 shows an amount of a sequential threshold voltage change of a switching element when a gate-on voltage Von of 28V and a gate-off voltage Voff of −7V are applied to a control terminal and an input terminal of a switching element, respectively, according to compensation driving of a threshold value.

As shown in FIG. 7, when 30 minutes have elapsed after compensation driving of a threshold value, a threshold voltage increased about 4V. According to experiment, a general color bleach phenomenon occurs if a threshold voltage rises about 4V. When an LCD is designed to perform compensation driving of a threshold value for a preset period without measuring a leakage current for a compensation driving period of a threshold value, the threshold value compensation driving period may be set to 30 minutes. However, if the LCD is driven again for this period, the gate driver 400 and the data driver 500 of the LCD stop compensation driving of a threshold value and are driven according to a signal that is transferred from the signal controller 600. As can be seen in a graph of FIG. 7, compensation of a threshold voltage for this period is very well performed, compared with that of a threshold voltage for a compensation driving period of a threshold value, e.g., the slope of the graph after 30 minutes, wherein compensation driving is performed, is significantly lower than the period preceding the 30 minute mark. Therefore, even if a period of less than 30 minutes is set as the compensation driving period and compensation driving of a threshold value is performed, the leakage current amount can be reduced, compared with that of a conventional case.

Further, measurement of a leakage current while performing compensation driving of a threshold value can be performed with a method in which the sensing unit 900 measures a leakage current and compares the leakage current with a threshold value after performing compensation driving of a threshold value for a predetermined period shorter than 30 minutes.

In the present exemplary embodiment, each of the test pixels TPX is connected to one of the two data dummy lines Dt1 and Dt2 and one of the two gate lines G1 and Gn, but the present invention is not limited thereto. An exemplary embodiment of an LCD according to the present invention can measure a leakage current using at least one test pixel. The exemplary embodiment shown in FIG. 1 measures the leakage current in four positions due to possible variations in a leakage current of each of a plurality of pixels PX. Alternative exemplary embodiments also include configurations wherein more than four test pixels TPX may be formed.

Further, in an exemplary embodiment of the present invention, as the sensing unit 900 controls the gate driver 400 and the data driver 500, compensation driving of a threshold value is performed, but the present invention is not limited thereto. Alternative exemplary embodiments also include configurations wherein a separate driver may be further included to perform compensation driving of a threshold value. In such an alternative exemplary embodiment, if the sensing unit 900 provides information that a leakage current is greater than a threshold value, a separate driver applies a predetermined first voltage and second voltage to a plurality of gate lines and data lines, respectively, thereby performing compensation driving of a threshold value. In this case, the first voltage and the second voltage are different from a voltage that is applied to a control terminal and an input terminal, respectively, of the switching element Q when the LCD is driven. Specifically, a voltage difference between the first voltage and the second voltage has opposite polarity to that of a voltage difference that is applied to each of a control terminal and an input terminal of the switching element Q when the LCD is turned off while driving.

In this way, the exemplary embodiments of an LCD according to the present invention detect a leakage current when it is not driven and compensates a threshold voltage change of a switching element. Accordingly, the present invention provides an LCD that can display a clearer picture quality by preventing a color bleach phenomenon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a plurality of gate lines which transfer a plurality of gate signals;
a plurality of data lines which transfer a plurality of data signals;
at least one dummy data line which transfers at least one test data signal;
a data driver which generates and outputs the plurality of data signals;
a gate driver which generates and outputs the plurality of gate signals;
a plurality of pixels, each of which comprises a switching element having a control terminal and an input terminal connected to a corresponding gate line of the plurality of gate lines and a corresponding data line of the plurality of data lines, respectively;
at least one test pixel comprising at least one test switching element having a control terminal connected to a corresponding at least one gate line of the plurality of gate lines;
a sensing unit which measures a leakage current flowing through the test switching element and controls compensation driving of a threshold voltage of the switching element according to the measured leakage current; and
a selection unit which selects one of the sensing unit and the dummy data line,
wherein the selection unit connects an input terminal of the test switching element to the dummy data line when the liquid crystal display is driven, and connects the input terminal of the test switching element to the sensing unit when the liquid crystal display is not driven.

2. The liquid crystal display of claim 1, wherein the test switching element has substantially the same electrical characteristics as that of the switching element, and
wherein the leakage current is a current that flows through the test switching element when the test switching element is turned off.

3. The liquid crystal display of claim 2, wherein if the leakage current is greater than a predetermined threshold value, compensation driving of a threshold voltage of the switching element is performed.

4. The liquid crystal display of claim 2, wherein a first voltage is applied to a control terminal of each of the plurality of switching elements and a second voltage is applied to an input terminal thereof during a driving period that compensates a threshold voltage of the switching element, and a voltage difference between the first voltage and the second voltage has opposite polarity to that of a voltage difference between the control terminal and the input terminal when the switching element is turned off.

5. The liquid crystal display of claim 4, wherein the gate signal includes a gate-on voltage for turning on the switching element and a gate-off voltage for turning off the switching element, when the liquid crystal display is driven, and
the first voltage of the driving period that compensates the threshold voltage of the switching element is substantially the same as the gate-on voltage and the second voltage of the driving period that compensates the threshold voltage of the switching element is substantially the same as the gate-off voltage.

6. The liquid crystal display of claim 1, wherein the test switching element has substantially the same characteristics as that of the switching element, and the leakage current is a current that flows through the test switching element when the test switching element is turned off.

7. The liquid crystal display of claim 6, wherein the test switching element is turned off when the liquid crystal display is not driven, and
the sensing unit controls compensation driving of a threshold voltage of the switching element when the leakage current flowing through the turned-off test switching element is greater than a predetermined threshold value.

8. The liquid crystal display of claim 7, wherein the gate driver outputs a first voltage to each of the plurality of gate lines for a driving period that compensates a threshold voltage of the switching element, and the data driver outputs a second voltage to each of the plurality of data lines, and
a voltage difference between the first voltage and the second voltage has opposite polarity to that of a voltage difference between the control terminal and the input terminal thereof when the switching element is turned off.

9. The liquid crystal display of claim 8, wherein the sensing unit transfers a first compensation signal and a second compensation signal to the gate driver and the data driver, respectively,
the gate driver outputs the first voltage to each of the plurality of gate lines in response to the first compensation signal, and
the data driver outputs the second voltage to each of the plurality of data lines in response to the second compensation signal.

10. The liquid crystal display of claim 8, wherein the gate driver and the data driver terminate compensation driving of a threshold voltage and generate and output the plurality of gate signals and the plurality of data signals, respectively, after the liquid crystal display is driven via compensation driving for a driving period that compensates the threshold voltage of the switching element.

11. The liquid crystal display of claim 1, wherein the at least one test data signal is substantially the same as one of a plurality of data signals.

12. A method of driving a liquid crystal display, the method comprising:
providing a plurality of gate signals to a plurality of gate lines, wherein the plurality of gate signals includes a gate-off signal;

providing a plurality of data signals to a plurality of data lines;

controlling a switching operation of a first switching element and a second switching element using at least one of the plurality of gate signals;

measuring a leakage current flowing through the first switching element during the application of a gate-off signal to a control terminal of the first switching element and the application of a data signal to an input terminal of the first switching element; and controlling compensation driving of the first and second switching elements according to the measured leakage current, wherein a selection unit connects an input terminal of the first switching element to the data line when the liquid crystal display is driven, and connects the input terminal to the sensing unit measuring the leakage current when the liquid crystal display is not driven.

* * * * *